United States Patent

Aramaki

(10) Patent No.: US 12,067,155 B2
(45) Date of Patent: Aug. 20, 2024

(54) FUSE-BASED SYSTEM ON A CHIP DISCONNECTION IN A STORAGE DEVICE

(71) Applicants: Kabushiki Kaisha Toshiba, Tokyo (JP); Toshiba Electronic Devices & Storage Corporation, Tokyo (JP)

(72) Inventor: Yasuto Aramaki, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 259 days.

(21) Appl. No.: 17/410,861

(22) Filed: Aug. 24, 2021

(65) Prior Publication Data

US 2022/0292227 A1    Sep. 15, 2022

(30) Foreign Application Priority Data

Mar. 15, 2021 (JP) .................. 2021-041646

(51) Int. Cl.
| | |
|---|---|
| G06F 21/79 | (2013.01) |
| G06F 3/06 | (2006.01) |
| G06F 21/72 | (2013.01) |
| H04L 9/08 | (2006.01) |

(52) U.S. Cl.
CPC ............ G06F 21/79 (2013.01); G06F 3/0623 (2013.01); G06F 3/0659 (2013.01); G06F 3/0679 (2013.01); G06F 21/72 (2013.01); H04L 9/0894 (2013.01)

(58) Field of Classification Search
CPC .......... G06F 21/72; G06F 21/78; G06F 21/79; G06F 3/0622; G06F 3/0623; G06F 3/0634; G06F 3/0659; G06F 3/0673; G06F 3/0679; H04L 9/0822; H04L 9/0894

See application file for complete search history.

(56) References Cited

U.S. PATENT DOCUMENTS

| | | | |
|---|---|---|---|
| 6,292,898 B1 * | 9/2001 | Sutherland | G06F 21/87 713/193 |
| 6,441,665 B1 | 8/2002 | Hashidate et al. | |
| 7,020,019 B2 * | 3/2006 | Salessi | G11C 16/225 365/185.04 |
| 7,237,121 B2 | 6/2007 | Cannack et al. | |
| 7,430,136 B2 * | 9/2008 | Merry, Jr. | G11C 16/22 711/E12.1 |

(Continued)

FOREIGN PATENT DOCUMENTS

| | | |
|---|---|---|
| JP | 2001-156255 A | 6/2001 |
| JP | 2003-108257 | 4/2003 |

(Continued)

OTHER PUBLICATIONS

Innodisk. "Innodisk Physical Destroy for SSDs", Dec. 2016. (Year: 2016).*

*Primary Examiner* — Michael Simitoski

(74) *Attorney, Agent, or Firm* — Knobbe Martens Olson & Bear LLP

(57) ABSTRACT

According to one embodiment, a storage device includes a SoC, a disk, and an e-fuse. The SoC is an integrated circuit configured on one chip on which a CPU is mounted. The disk is controlled through the SoC. The e-fuse is provided on a clock signal line mounted in the SoC and is disconnected by an external input to the CPU.

16 Claims, 11 Drawing Sheets

(56) References Cited

U.S. PATENT DOCUMENTS

| | | | | |
|---|---|---|---|---|
| 7,442,583 B2* | 10/2008 | Bonaccio | G06F 21/6245 | |
| | | | 257/209 | |
| 7,550,789 B2* | 6/2009 | Bonaccio | G06F 12/1433 | |
| | | | 257/209 | |
| 7,761,714 B2* | 7/2010 | Luzzi | H04L 9/0866 | |
| | | | 326/8 | |
| 9,619,637 B2* | 4/2017 | Hamid | G06F 21/32 | |
| 10,044,514 B1* | 8/2018 | Peterson | H04L 9/0894 | |
| 10,484,371 B2* | 11/2019 | Ellis | H04L 63/0853 | |
| 10,496,811 B2* | 12/2019 | Gulati | H04L 9/0891 | |
| 10,747,295 B1* | 8/2020 | Paaske | G06F 1/3287 | |
| 10,997,297 B1* | 5/2021 | Lin | H04L 9/30 | |
| 11,152,052 B1* | 10/2021 | Morishita | G11C 16/20 | |
| 11,449,264 B2* | 9/2022 | Strong | G06F 3/062 | |
| 11,616,767 B2* | 3/2023 | Helmick | H04L 9/14 | |
| | | | 713/193 | |
| 2002/0108006 A1* | 8/2002 | Snyder | G06F 13/4068 | |
| | | | 710/100 | |
| 2007/0165456 A1* | 7/2007 | Salessi | G11C 16/22 | |
| | | | 365/185.04 | |
| 2007/0296065 A1* | 12/2007 | Yew | H01L 24/24 | |
| | | | 257/659 | |
| 2009/0106563 A1* | 4/2009 | Cherpantier | G06F 21/86 | |
| | | | 726/34 | |
| 2009/0119744 A1* | 5/2009 | Lange | G06F 21/70 | |
| | | | 726/1 | |
| 2012/0069690 A1 | 3/2012 | Yazawa et al. | | |
| 2012/0194564 A1* | 8/2012 | White | G09G 3/2088 | |
| | | | 345/690 | |
| 2013/0238873 A1* | 9/2013 | Yu | G06F 3/0652 | |
| | | | 711/166 | |
| 2015/0008955 A1* | 1/2015 | Kwon | G06F 21/76 | |
| | | | 326/8 | |
| 2015/0046717 A1 | 2/2015 | Hagiwara et al. | | |
| 2017/0244562 A1* | 8/2017 | He | H04L 9/0861 | |
| 2018/0095770 A1* | 4/2018 | Brown | G06F 21/74 | |
| 2018/0337916 A1* | 11/2018 | Ellis | H04L 9/3226 | |
| 2019/0121571 A1* | 4/2019 | Wahla | G06F 3/0679 | |
| 2019/0215167 A1 | 7/2019 | Wu et al. | | |
| 2019/0332763 A1* | 10/2019 | Berler | H04L 9/3271 | |
| 2019/0370501 A1* | 12/2019 | Awan | H04L 9/0877 | |
| 2020/0065528 A1* | 2/2020 | Ogawa | G06F 3/0679 | |
| 2020/0371697 A1* | 11/2020 | Kao | G11C 16/22 | |
| 2021/0091954 A1* | 3/2021 | Brown | H04L 9/3226 | |
| 2021/0184871 A1* | 6/2021 | Kim | G11C 7/062 | |
| 2021/0216616 A1* | 7/2021 | Lee | G06F 21/805 | |
| 2021/0223968 A1* | 7/2021 | Umesawa | H04L 9/3247 | |
| 2021/0281431 A1* | 9/2021 | Swaminathan | G06F 12/1483 | |
| 2021/0294504 A1* | 9/2021 | Shirakura | G06F 3/0625 | |
| 2021/0326066 A1* | 10/2021 | Bommana | G06F 3/0634 | |
| 2021/0334416 A1* | 10/2021 | Jung | G06F 21/79 | |
| 2021/0342487 A1* | 11/2021 | Yu | G06F 3/0652 | |
| 2021/0350032 A1* | 11/2021 | Dover | H04L 9/3263 | |
| 2021/0350034 A1* | 11/2021 | Delaney | H04M 15/47 | |
| 2021/0366563 A1* | 11/2021 | Kim | H04L 9/0894 | |
| 2022/0206692 A1* | 6/2022 | Choi | G06F 21/62 | |
| 2023/0306141 A1* | 9/2023 | Ramaiah | G06F 9/4411 | |

FOREIGN PATENT DOCUMENTS

| | | |
|---|---|---|
| JP | 2006-172451 | 6/2006 |
| JP | 2012-069565 A | 5/2012 |
| JP | 2015-036847 A | 2/2015 |
| JP | 2019-122046 | 7/2019 |

* cited by examiner

500# FUSE-BASED SYSTEM ON A CHIP DISCONNECTION IN A STORAGE DEVICE

INCORPORATION BY REFERENCE TO RELATED APPLICATION

This application is based upon and claims the benefit of priority from Japanese Patent Application No. 2021-041646, filed Mar. 15, 2021, the entire contents of which are incorporated herein by reference. Any and all applications for which a foreign or domestic priority claim is identified in the Application Data Sheet as filed with the present application are hereby incorporated by reference under 37 CFR 1.57.

FIELD

Embodiments described herein relate generally to a storage device.

BACKGROUND

When a user (for example, a data center company or an administrative service organization) who uses a storage device such as a hard disk drive (HDD) disposes of a storage device that is no longer needed, in most cases, the user requests a disposal processing company to dispose of the storage device. After that, the storage device requested to be disposed of is assumed to be disposed of. However, as some illegal process, without notifying the user who requests disposal or without acquiring user's permission, the storage device may be re-distributed to the market as a reused product or online auction product. Accordingly, important information (for example, confidential information such as customer information, personal information, trade secrets, or the like) stored in the storage device might be leaked to a third party, and thus, it is desirable to prevent the storage device from being re-distributed to the market as a reused product or the like as well as to prevent the important information from being leaked.

Examples of related art include JP-A-2006-172451, JP-A-2019-122046, and JP-A-2003-108257.

DETAILED DESCRIPTION

Embodiments provide storage devices that can be safely disposed of.

In general, according to one embodiment, there is provided a storage device including a SoC, a storage medium, and a fuse. An arithmetic device is mounted on the SoC. The storage medium is controlled via the SoC. The fuse is provided on an electric line mounted in the SoC and is disconnected by an external input to the arithmetic device.

Hereinafter, storage devices according to embodiments will be described in detail with reference to the drawings. It is noted that the components in these embodiments include components that can be replaced and is easily replaced by those skilled in the art and substantially the same components, and the present disclosure is not limited by the following embodiments. In addition, as the storage device according to the embodiment, an HDD equipped with a system on a chip (SoC) will be described below as an example. It is noted that the present disclosure is not limited to this HDD. The present disclosure may be applied to a storage device such as a solid state drive (SSD) or a semiconductor memory equipped with the SoC.

First Embodiment

Figure 1:
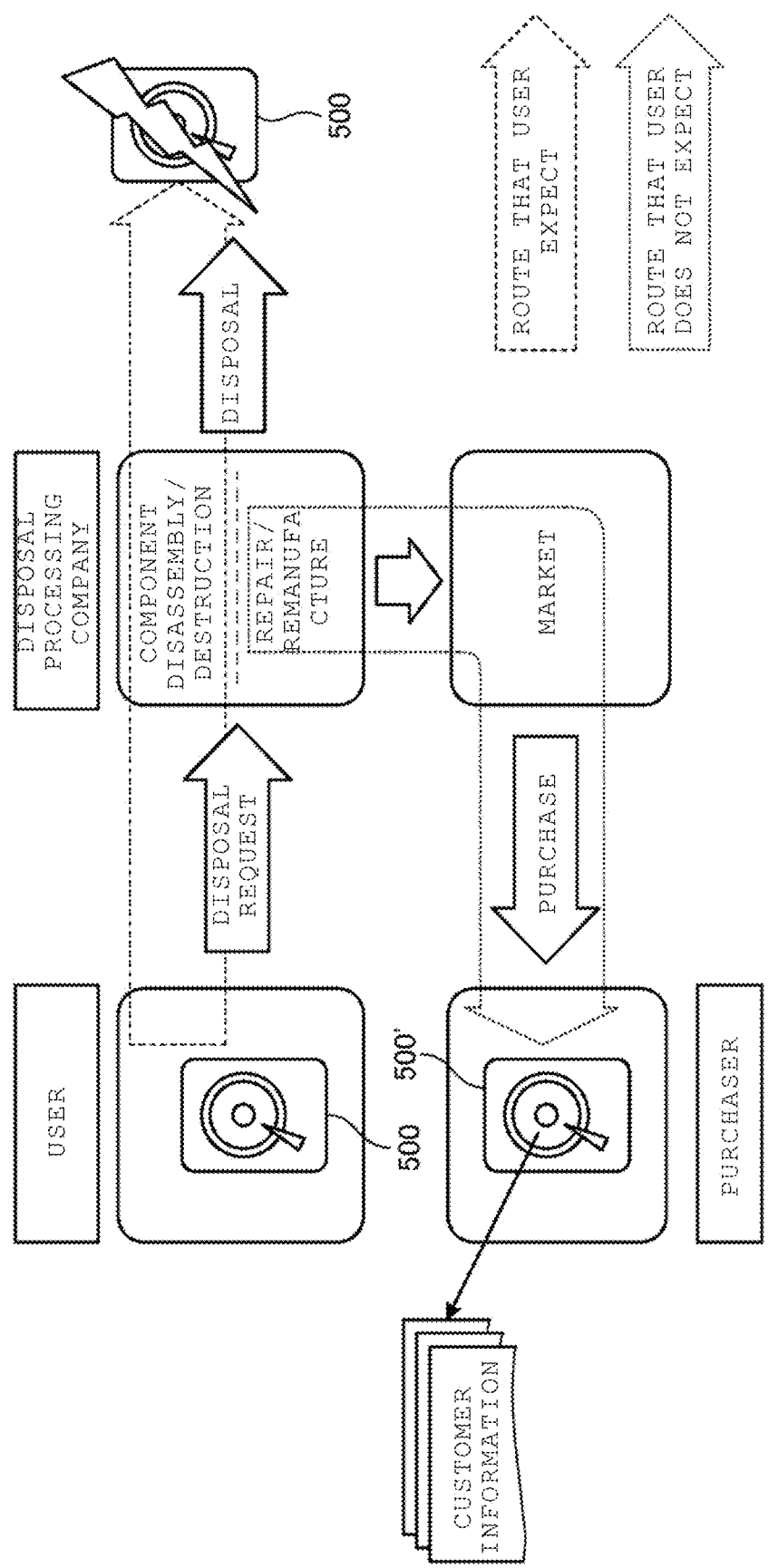
FIG. 1 is a diagram illustrating an example of a flow of disposal of a storage device.
Figure 2:
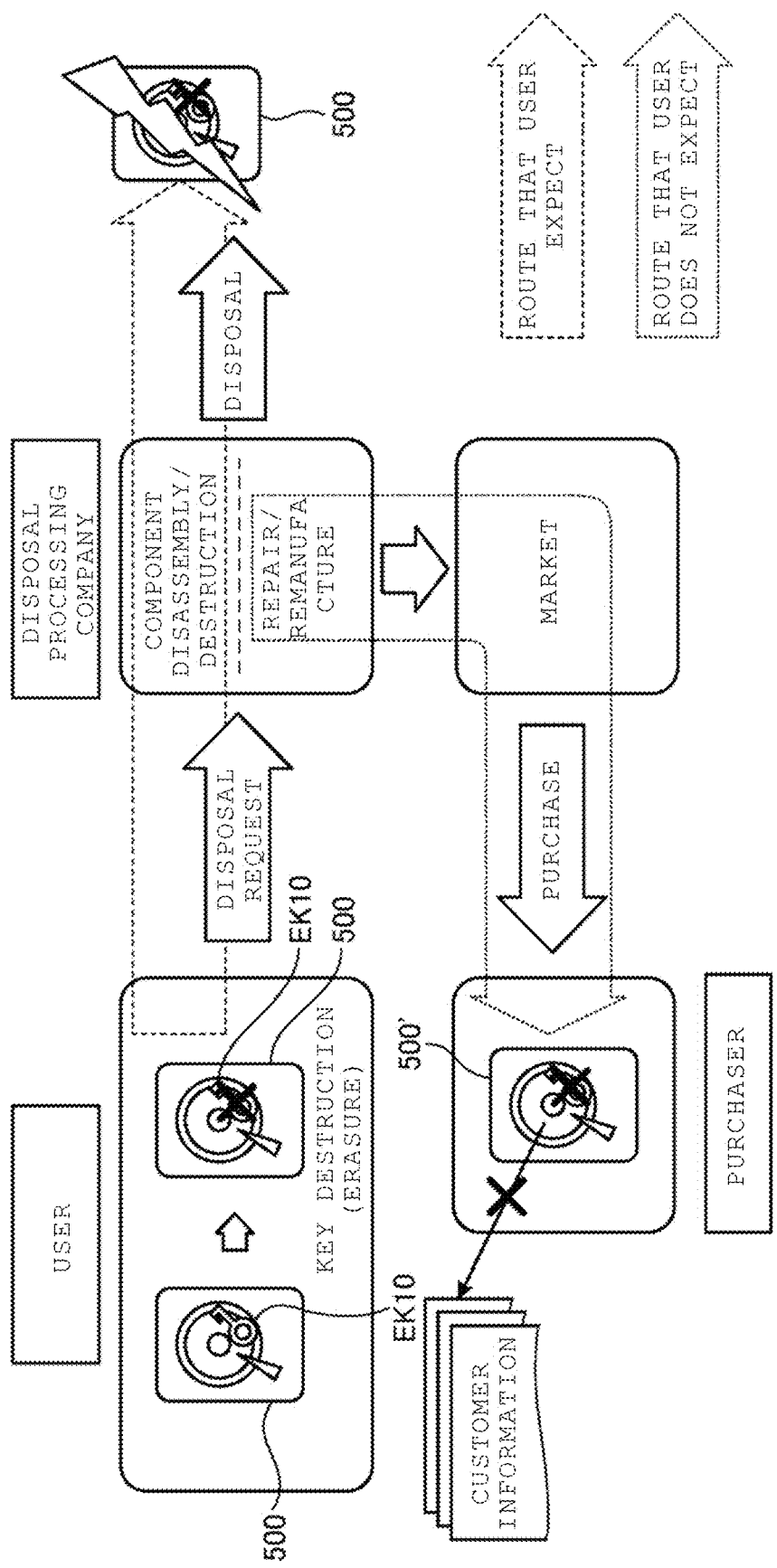
FIG. 2 is a diagram illustrating an example of a flow of discarding of a cryptographic storage device.
Figure 3:
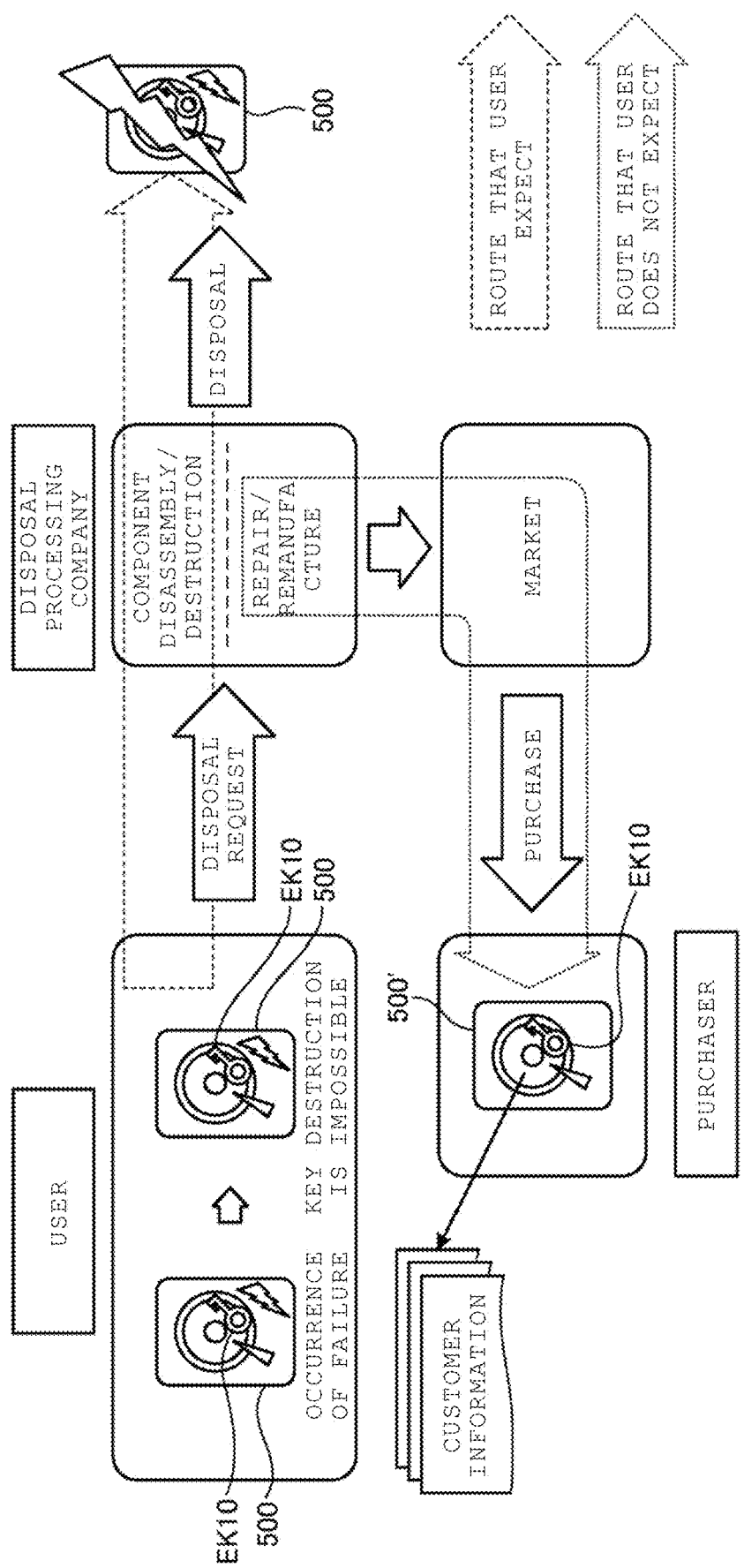
FIG. 3 is a diagram illustrating an example of a flow of disposal of a failed storage device.

FIG. 1 is a diagram illustrating an example of a flow of disposal of a storage device. FIG. 2 is a diagram illustrating an example of a flow of discarding a cryptographic storage device. FIG. 3 is a diagram illustrating an example of a flow of disposal of a failed storage device. The flow of disposal of the storage device in the related art will be described with reference to FIGS. 1 to 3.

First, the example illustrated in FIG. 1 illustrates a flow when a disposal processing company is requested to dispose of the HDD 500 that is a disposal target without taking any measures on the user side. Usually, the disposal processing company that receives the disposal request disassembles or destructs the HDD 500 that is a disposal target to dispose of the HDD 500. However, as illustrated in FIG. 1, in some cases, as some illegal process without notifying the user who requests disposal or without acquiring user's permission, the disposal processing company may re-distribute the HDD 500 to the market as a reused product or online auction product. Accordingly, a third party who is a purchaser of the HDD 500 can acquire important information (for example, confidential information such as customer information, personal information, and trade secrets) stored in the HDD 500, and thus, there is a great risk of information leakage.

In addition, in order to prevent the important information such as customer information from be leaked, it is considered that it is the responsibility of the user to erase the important information such as customer information before requesting the disposal processing company to dispose of the storage device. However, in general, in the storage device such as an HDD, it takes time to overwrite and erase the data as the capacity increases. For this reason, it is recommended to use an HDD provided with an encryption function (hereinafter, sometimes referred to as an "encryption HDD") in order to erase the data safely in a short time.

In this case, as in the example illustrated in FIG. 2, when disposing of the HDD 500 which is an encryption HDD, the user erases only an encryption key EK10 in advance and requests the disposal processing company to dispose of the HDD. However, in a state where the important information itself remains to be stored without being damaged and the functions of the SoC and the like remain normal, the HDD 500 is handed over to a third party, which is not a preferable state.

In addition, even when the encryption HDD is used, when a failure of the disk which is a storage medium not rotating occurs before the encryption key EK10 is erased, the encryption key EK10 is usually stored in the disk, so that it is impossible to erase the encryption key EK10. The example illustrated in FIG. 3 illustrates a flow when the disposal processing company is requested to dispose of the HDD 500 which is an encryption HDD in which a failure of a disk not rotating or the like occurs. When the failed HDD 500 is handed over to the disposal processing company as it is, if the cause of this failure is, for example, a defective electrical component that can be procured from an encryption HDD of the same model or an electrical contact failure due to dust or the like, the disposal processing company can repair or restore the encryption HDD. Then, after the repairing or restoring by the disposal processing company is completed, when the HDD is re-distributed to the market as a reused product, an online auction product, or the like, since important information such as customer information and the encryption key EK10 remain as they are, the risk of leaking the important information is greatly increased.

In the cases illustrated in FIGS. 1 to 3 above, in order to avoid a situation where an HDD 500 is distributed to the market again and important information is leaked, it is necessary for the user himself/herself to securely physically destruct disks or a magnetic reading head of the HDD 500 by using a puncher or the like. However, it is disadvantageous in terms of labor and cost.

Figure 4:
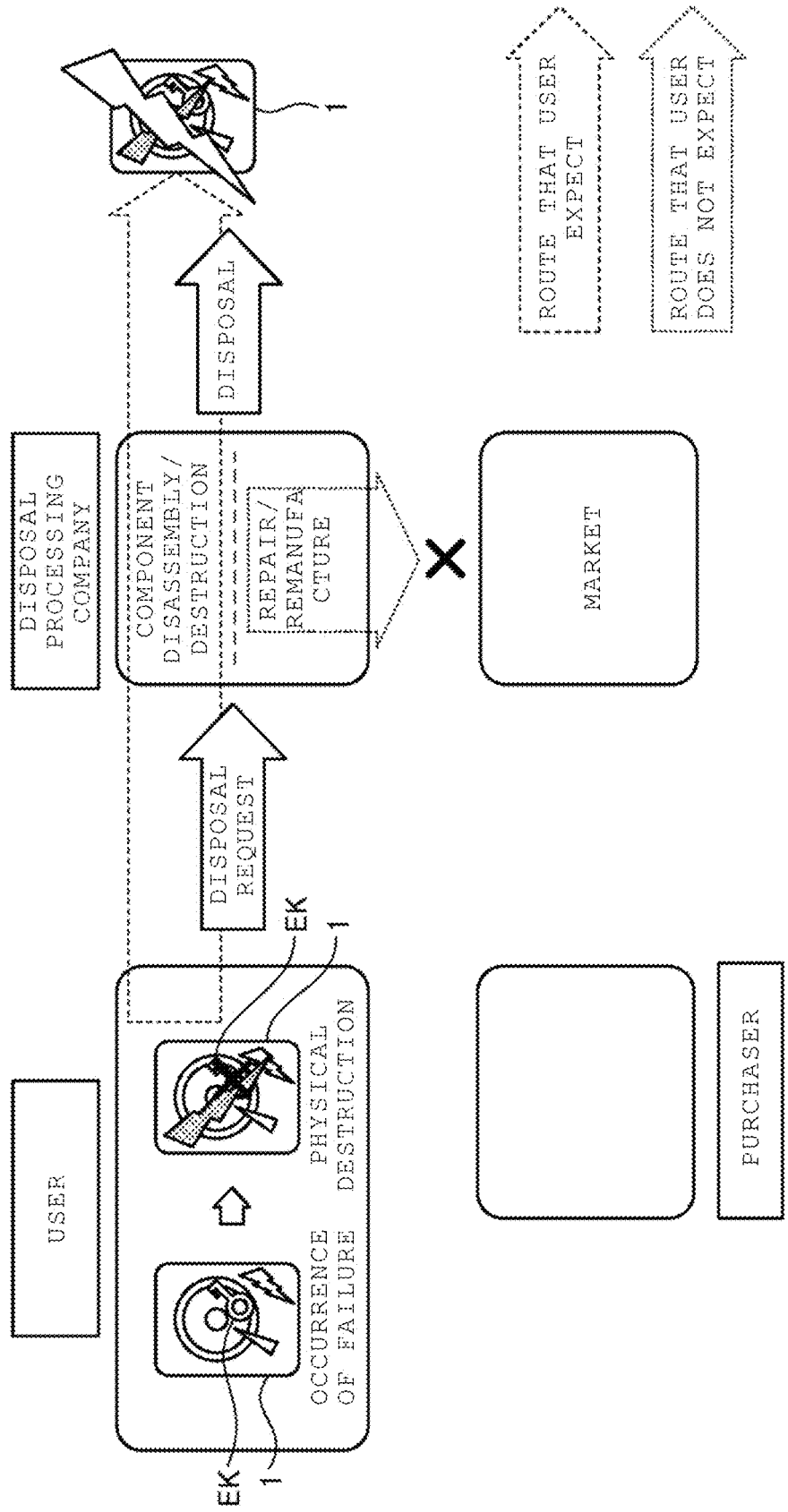
FIG. 4 is a diagram illustrating a flow of disposal of a storage device according to a first embodiment.

FIG. 4 is a diagram illustrating a flow of disposal of the storage device according to the first embodiment. With respect to an HDD 1 according to this embodiment, by connecting the HDD 1 to a host terminal such as an external personal computer (PC) having a normal configuration and transmitting a destruct command from the host terminal to the HDD 1, the user can physically destruct the HDD so that the HDD 1 cannot be started up. Accordingly, as illustrated in FIG. 4, it is possible for the user to prevent the product from being re-distributed to the market as a reused product, an online auction product, or the like. In addition, as described above, since the physical destruction can be performed only by transmitting the destruct command from the host terminal connected to the HDD 1, it is possible to remove the need for a special destruction tool. Hereinafter, configuration and operations of the HDD 1 according to this embodiment will be described in detail.

Figure 5:
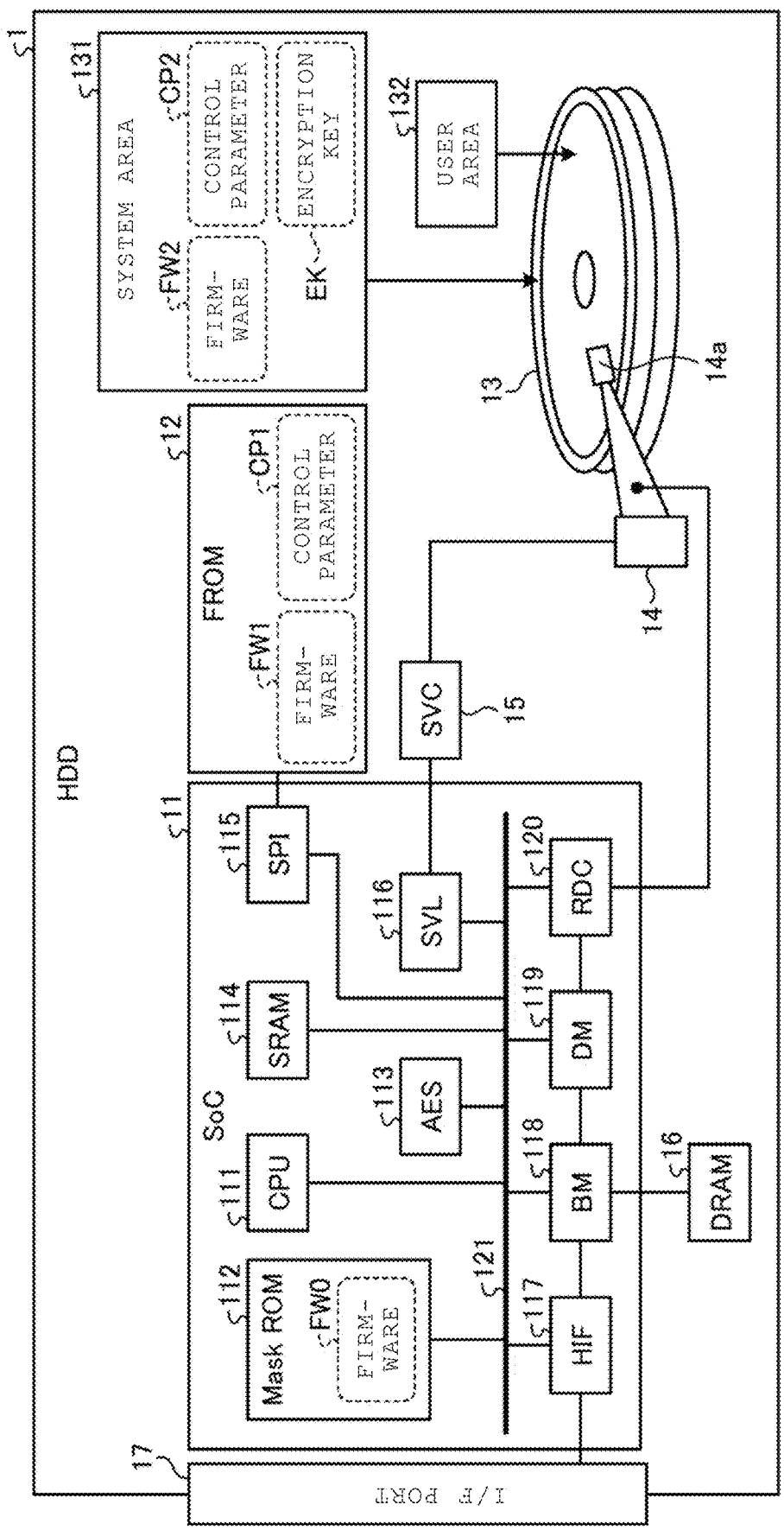
FIG. 5 is a diagram illustrating an example of a configuration of the storage device according to the first embodiment.
Figure 6:
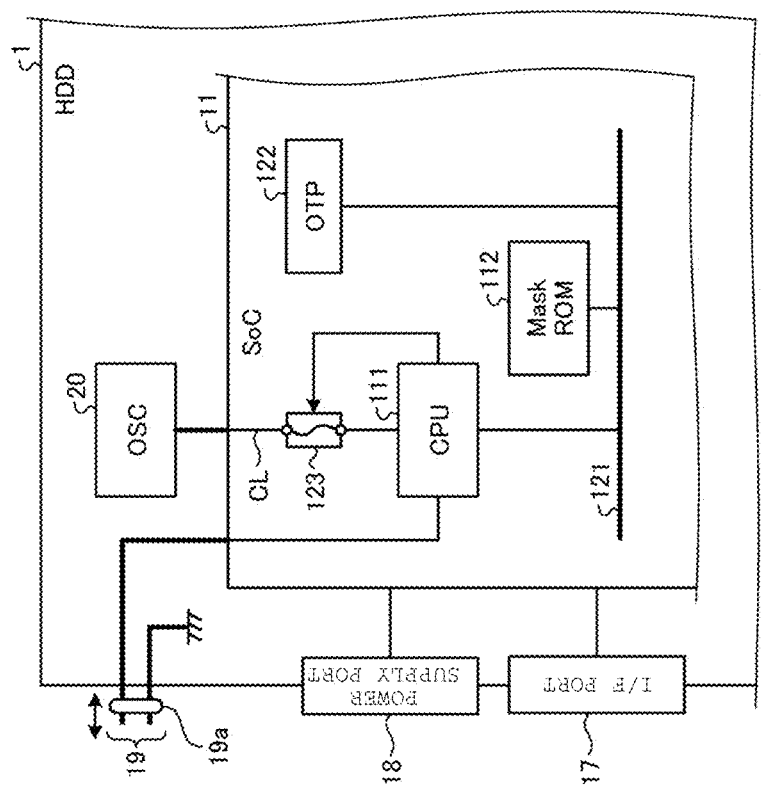
FIG. 6 is a diagram illustrating an example of an e-fuse connection configuration of a SoC in the storage device according to the first embodiment.

FIG. 5 is a diagram illustrating an example of the configuration of the storage device according to the first embodiment. FIG. 6 is a diagram illustrating an example of an e-fuse connection configuration of a SoC in the storage device according to the first embodiment. The configuration of the HDD 1 according to this embodiment will be described with reference to FIGS. 5 and 6.

The HDD 1 illustrated in FIG. 5 is a nonvolatile storage device mounted on an information processing device such as a personal computer (PC) for storing various user data (including programs and the like). As illustrated in FIG. 5, the HDD 1 includes a SoC 11, a flash read only memory (Flash-ROM) 12 (hereinafter, referred to as a FROM 12) (second storage unit), a disk 13 (an example of a storage medium), a voice coil motor (VCM) 14, a servo combo (SVC) 15, a dynamic random access memory (DRAM) 16, and an I/F port 17.

The SoC 11 is an integrated circuit configured on one chip to integrate an arithmetic function, a data storage function, and the like so as to function as a system. As illustrated in FIG. 5, the SoC 11 includes a central processing unit (CPU) 111, a mask ROM 112, an advanced encryption standard (AES) 113 (encryption unit), a static RAM (SRAM) 114, a serial peripheral interface (SPI) 115, a servo logic (SVL) 116, a host interface (HIF) 117, a buffer manager (BM) 118, a disk manager (DM) 119, a read channel (RDC) 120, and a bus 121.

The CPU 111 is an arithmetic device that controls the operations of the SoC 11 and the entire operations of the HDD 1.

The mask ROM 112 is a nonvolatile storage circuit that stores initial setting at the time of being powered on and firmware FW0 which is an initial program loader (IPL) for reading the firmware stored in the FROM 12. When the power of the HDD 1 is turned on, first, firmware FW0 stored in the mask ROM 112 is executed (started up) by the CPU 111, and firmware FW1 stored in the FROM 12 described later is started up.

The AES 113 is an encryption circuit that performs a data encryption process by using a random number value. In addition, as will be described later, the AES 113 also performs a process of encrypting the user data stored in the disk 13 by using an encryption key.

The SRAM 114 is a semiconductor memory that stores data for internal processing and the like. The SPI 115 is an interface for reading data from the FROM 12.

The SVL 116 is a control circuit that controls the SVC 15. The HIF 117 is a circuit that processes a command received from a host terminal such as an external PC via the I/F port 17.

The BM 118 is a circuit that manages the DRAM 16 that functions as a data cache. The DM 119 is a circuit that controls the disk 13 and manages the reading and writing of data.

The RDC 120 is a circuit that converts data represented by, for example, a hexadecimal number into a binary number state that can be written to the disk 13. The bus 121 is a communication path that connects the circuits and the elements of the SoC 11 to enable data communication with each other.

The FROM 12 is a nonvolatile storage circuit that stores a firmware FW1 for reading data from a system area 131 of the disk 13 described later and a control parameter CP1 (first control parameter) used by the firmware FW1 for rotating the disk 13 and operating a head 14a. The control parameter CP1 is various parameters adjusted and quantified for each HDD 1 so as to correspond to a combination of physical characteristics of the head 14a, the motor of the disk 13, and the like. Therefore, when the HDD 1 changes, the control parameter CP1 stored in the FROM 12 of the HDD 1 has a different numerical value. When the firmware FW1 is started up by the firmware FW0 as described above, the firmware FW1 allows the disk 13 to rotate and the head 14a to operate by using the control parameter CP1, so that firmware FW2 stored in the system area 131 of the disk 13 described later is started up.

The disk 13 is a storage medium that implements the main purpose such as storage of the user data in the HDD 1. As illustrated in FIG. 5, the disk 13 includes the system area 131 (second area) and a user area 132 (first area).

The system area 131 is a storage area that stores the firmware FW2 for reading the user data from the user area 132, a control parameter CP2 (second control parameter) used by the firmware FW2 to access the user area 132 and an encryption key EK for encrypting and decrypting the user data. The control parameter CP2 is various parameters adjusted and quantified so as to correspond to a combination of characteristics such as shape deformation and recording density of the disk 13. Therefore, when the HDD 1 is changed, the control parameter CP2 stored in the system area 131 of the HDD 1 has a different numerical value. When the firmware FW2 is started up by the firmware FW1 as described above, the firmware FW2 performs accessing the user area 132 by using the control parameter CP2.

The user area 132 is a storage area for storing the user data. Specifically, the user area 132 stores the user data in a state of being encrypted by using the encryption key EK stored in the system area 131.

The VCM 14 is a motor for operating the head 14a for reading and writing the data stored in the disk 13. The SVC 15 is a drive circuit that controls a rotational operation of the VCM 14.

The DRAM 16 is a semiconductor memory that functions as a data cache.

The I/F port 17 is an interface for data communication with an outside (for example, a PC equipped with the HDD 1).

As illustrated in FIG. 6, the HDD 1 further includes a power supply port 18, an external terminal 19, and an oscillator (OSC) 20 (output device). In addition, as illustrated in FIG. 6, the SoC 11 further includes an one-time programmable (OTP) 122 (first storage unit) connected to the bus 121 and an e-fuse 123.

The power supply port 18 is a port for supplying power to each element including the SoC 11 of the HDD 1. For example, as illustrated in FIG. 6, the SoC 11 is supplied with power from the power supply port 18 via the power supply line PL.

The external terminal 19 is a terminal for switching whether or not to ground the SoC 11. For example, by attaching a short-circuit member 19a to the external terminal 19, the terminals of the external terminal 19 are short-circuited, and the CPU 111 can recognize that the SoC 11 is in a state of being grounded via the external terminal 19.

The OSC 20 is a device that generates a clock signal for arithmetic processes of the CPU 111. The OSC 20 outputs a clock signal to the CPU 111 via a clock signal line CL.

The OTP 122 is a storage device in which data can be written only once and cannot be rewritten thereafter. Specifically, the OTP 122 stores a predetermined random number value in a non-rewritable manner. For example, the manufacturer of the HDD 1 may write a predetermined random number value in advance in the OTP 122 before shipping or the like.

It is noted that the present disclosure is not limited to writing the random number value in the OTP 122 in advance, and for example, the HDD 1 may internally generate the random number value and write the random number value by itself. In this case, the firmware FW1 or the firmware FW2 may have a function of generating the random number value and writing the random number value in the OTP 122. In addition, the OTP 122 may store a unique value unique to the HDD 1 in addition to the random number value.

The e-fuse 123 is a physical fuse member provided on the clock signal line CL (signal line) that connects the CPU 111 and the OSC 20. The e-fuse 123 physically disconnects the clock signal line CL by a disconnect instruction from the CPU 111. In order to implement this, the firmware FW0 includes a function of receiving the destruct command (destruct instruction) from an external host terminal or the like via the I/F port 17 and a function of outputting the disconnect instruction for disconnecting the e-fuse 123 when the destruct command is received. Accordingly, when the destruct command is received from the external host terminal or the like, the firmware FW0 is started up, and the disconnect instruction for physically disconnecting the e-fuse 123 is output to the e-fuse 123. Accordingly, the e-fuse 123 is disconnected, that is, the clock signal line CL is disconnected, and thus, the clock signal is not supplied to the CPU 111, so that the operation of the SoC 11 (CPU 111) is disabled.

It is noted that the e-fuse 123 may disable the operation of the SoC 11 (CPU 111) and may be provided not only on the clock signal line CL described above but also on, for example, the power supply line to the CPU 111. In addition, the destruct command transmitted from the host terminal or the like may be used by changing a service action code of the existing command or may be a special command set by the manufacturer.

In addition, in order to prevent unintended disconnection of the e-fuse 123 due to illegal issuance or erroneous issuance of the destruct command, as described above, when the short-circuit member 19a is attached to the external terminal 19, and the terminals are short-circuited, the CPU 111 may disable the destruct command.

Figure 7:
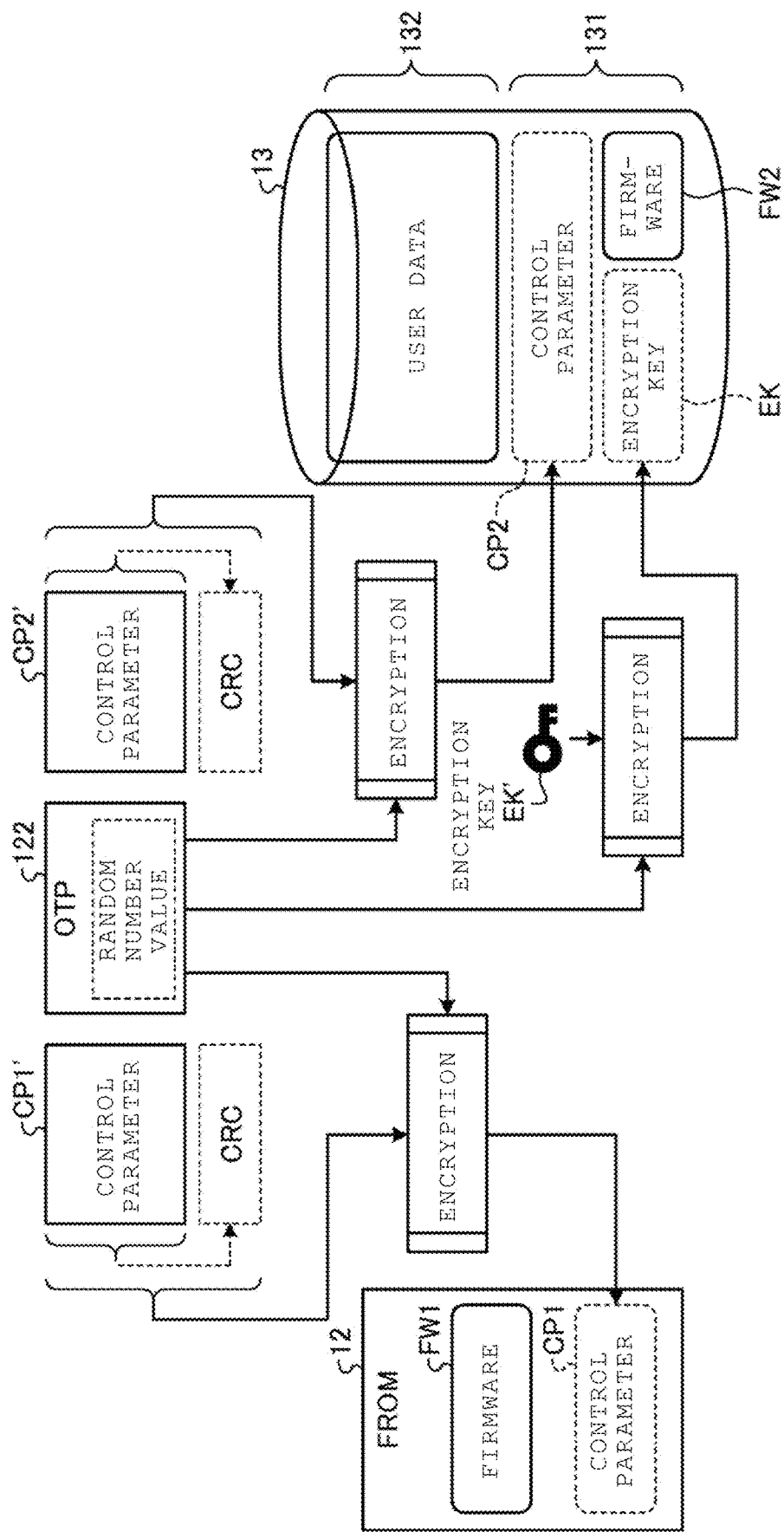
FIG. 7 is a diagram illustrating an example of a mode of storing control parameters and encryption keys in the storage device according to the first embodiment.

FIG. 7 is a diagram illustrating an example of a mode of storing control parameters and encryption keys in the storage device according to the first embodiment. The mode of storing the control parameters CP1 and CP2 and the encryption keys EK in the HDD 1 according to this embodiment will be described with reference to FIG. 7. It is noted that the control parameters CP1 and CP2 and the encryption key EK before the encryption are referred to as control parameters CP1' and CP2' and an encryption key EK', respectively, for the convenience of the description.

Before shipping the HDD 1, the manufacturer of the HDD 1 adds a verification value (first verification value) such as a checksum, a cyclic redundancy check (CRC) or a hash based on the control parameter CP1' to the control parameter CP1' and, after that, stores, in the FROM 12, a control parameter CP1 in a state of being encrypted (an example of a first process) by using the random number value stored in the OTP 122. That is, it can be said that the above-mentioned encryption is brought in a state where the control parameter CP1 can be used with the random number value again later. In addition, before shipping the HDD 1, the manufacturer of the HDD 1 adds a verification value (second verification value) such as a checksum, a CRC, or a hash based on the control parameter CP2' to the control parameter CP2' and, after that, stores, in the system area 131 of the disk 13, a control parameter CP2 in a state of being encrypted (an example of a second process) by using the random number value stored in the OTP 122. That is, it can be said that the above-mentioned encryption is brought in a state where the control parameter CP2 can be used with the random number value again later. Furthermore, before shipping the HDD 1, the manufacturer of the HDD 1 stores the encryption key EK' for the user data in the system area 131 of the disk 13 as the encryption key EK in a state of being encrypted by using the random number value stored in the OTP 122 in advance. It is not always necessary to add the verification value when encrypting the control parameters CP1' and CP2'. However, in the following description, the verification value is added.

It is noted that, for the encryption of the control parameters CP1' and CP2' and the encryption key EK', an encryption algorithm such as an advanced encryption standard (AES) may be used. In addition, when the HDD 1 internally generates the random number value and writes the random number value to the OTP 122, the firmware FW2 may have a function of encrypting the control parameter CP1' stored in the FROM 12 and the control parameter CP2' stored in the system area 131 by using the respective random number values when the random number is written to the OTP 122 and, after that, re-storing the control parameters in the FROM 12 and the system area 131, respectively.

Figure 8:
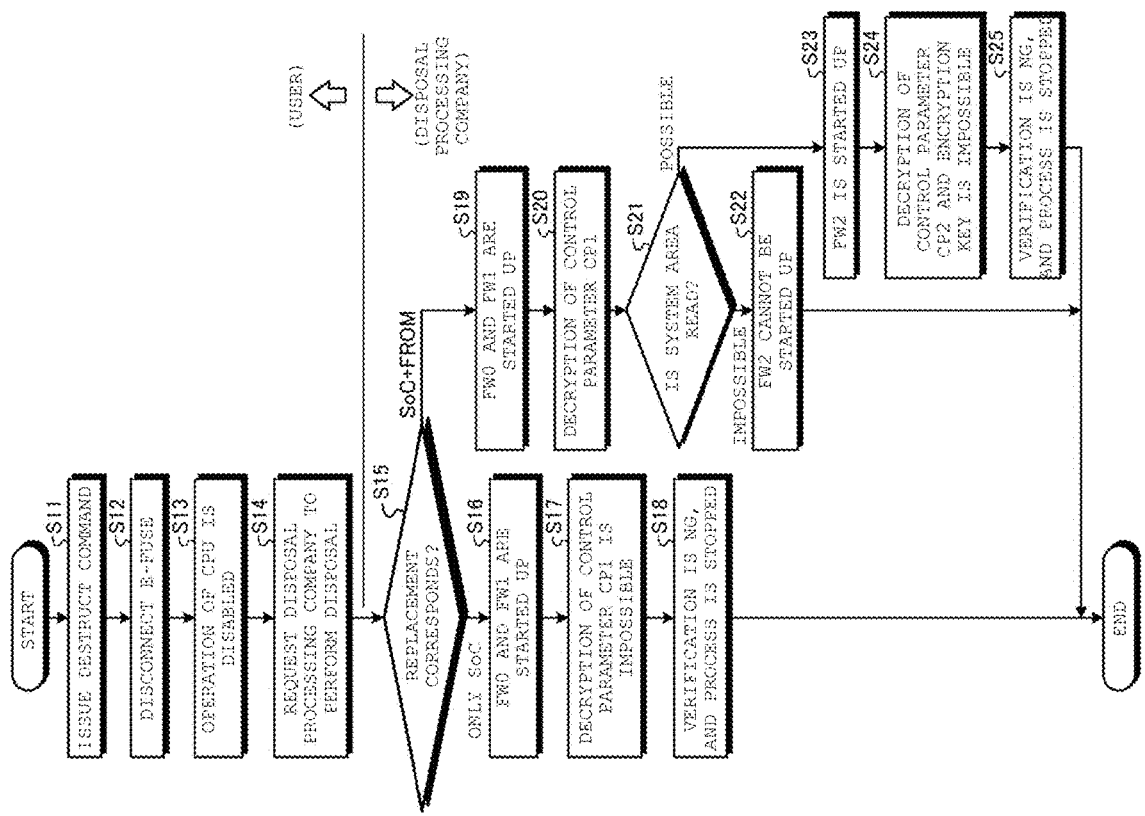
FIG. 8 is a flowchart illustrating an example of a flow of handling and processing of the storage device according to the first embodiment.
Figure 9:
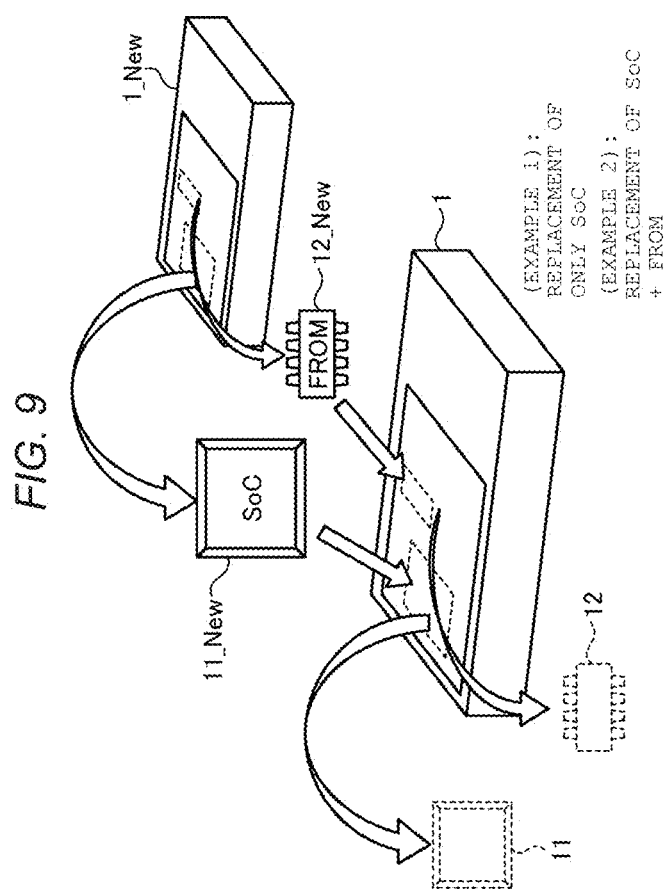
FIG. 9 is a diagram illustrating an example of part replacement from a storage device of the same model for the storage device according to the first embodiment.

FIG. 8 is a flowchart illustrating an example of the flow of handling and processing of the storage device according to the first embodiment. FIG. 9 is a diagram illustrating an example of part replacement from the storage device of the same model for the storage device according to the first embodiment. The flow of handling and processing of the HDD 1 according to this embodiment will be described with reference to FIGS. 8 and 9.

<Step S11>

When the user of the HDD 1 disposes of the HDD 1 which is an encryption HDD, the user allows the host terminal to issue the destruct command by operating the host terminal connected to the I/F port 17. Then, the CPU 111 receives the destruct command via the I/F port 17. Then, the process proceeds to step S12.

<Step S12>

When the CPU 111 receives the destruct command, the CPU 111 starts the firmware FW0. The firmware FW0 outputs the disconnect instruction for disconnecting the e-fuse 123 to the e-fuse 123 by the execution by the CPU 111. Accordingly, the e-fuse 123 is disconnected. Then, the process proceeds to step S13.

<Step S13>

When the e-fuse 123 is disconnected, the clock signal line CL is disconnected, and thus, the clock signal is not supplied to the CPU 111, so that the operation of the SoC 11 (CPU 111) is disabled. Accordingly, all of the firmware FW0, the firmware FW1, and the firmware FW2 cannot be executed, and the HDD 1 cannot be started up. Then, the process proceeds to step S14.

<Step S14>

The user hands over the HDD 1 physically destructed by disconnecting the e-fuse 123 to the disposal processing company and requests the disposal processing company to perform disposal. Then, the process proceeds to step S15.

<Step S15>

Hereinafter, the case where the disposal processing company that received the disposal request for the HDD 1 attempts to re-distribute the HDD 1 to the market as a reused product, an online auction product, or the like as an illegal process will be described. As illustrated in FIG. 9, when the disposal processing company extracts a SoC 11_New from an HDD 1_New of the same model as the physically destructed HDD 1 and attempts to replace the SoC 11 of the HDD 1 as an illegal process (step S15: only the SoC), the process proceeds to step S16. On the other hand, when the disposal processing company extracts the SoC 11_New and a FROM 12_New from the HDD 1_New of the same model as the physically destructed HDD 1 and attempts to replace the SoC 11 and the FROM 12 of the HDD 1 as an illegal process (step S15: SoC+FROM), the process proceeds to step S19.

<Step S16>

It is considered a case where the disposal processing company extracts the SoC 11_New from the HDD 1_New of the same model as the physically destructed HDD 1 and attempts to replace the SoC 11 of the HDD 1 as an illegal process. Since the e-fuse 123 of the replaced SoC 11_New in the HDD 1 is not disconnected, when the power of the HDD 1 is turned on, the firmware FW0 stored in the mask ROM 112 is executed (started up) by the CPU 111, and the firmware FW1 stored in the FROM 12 is also started up. Then, the process proceeds to step S17.

<Step S17>

In this case, the control parameter CP1 in the FROM 12 is decrypted by the AES 113 by using the random number value stored in the OTP 122 in the replaced SoC 11_New. However, since the random number value stored in the OTP 122 in the replaced SoC 11_New is different from the random number value stored in the OTP 122 of the SoC 11 before the replacement, the decryption cannot be correctly performed. Then, the process proceeds to step S18.

<Step S18>

Therefore, the firmware FW1 cannot read the data in the system area 131 of the disk 13 by the execution by the CPU 111 even when the decrypted control parameter CP1 is used. In addition, the firmware FW1 performs the verification of the control parameter CP1 by using the verification value of the decrypted control parameter CP1 by the execution by the CPU 111, and a result of the verification is NG, so that the process is stopped. As described above, since the HDD 1 which is an encryption HDD cannot be started up, the user data in the user area 132 in the HDD 1 cannot be read.

It is noted that, when the verification of the control parameter CP1 fails as described above, it can be checked that the random number values used are different, that is, the SoC 11 is illegally replaced with the SoC 11_New, and thus, at this point, the firmware FW0 or the firmware FW1 may disconnect the e-fuse 123 in the SoC 11_New by the execution by the CPU 111.

<Step S19>

It is considered a case where the disposal processing company extracts the SoC 11_New and the FROM 12_New from the HDD 1_New of the same model as the physically destructed HDD 1 and attempts to replace the SoC 11 and FROM 12 of the HDD 1 as an illegal process. Since the e-fuse 123 of the replaced SoC 11_New in the HDD 1 is not disconnected, when the power of the HDD 1 is turned on, the firmware FW0 stored in the mask ROM 112 is executed (started up) by the CPU 111, and the firmware FW1 stored in the replaced FROM 12_New is also started up. Then, the process proceeds to step S20.

<Step S20>

In this case, the control parameter CP1 in the FROM 12_New is decrypted by the AES 113 using the random number value stored in the OTP 122 in the replaced SoC 11_New. Since the control parameter CP1 in the FROM 12_New is originally encrypted by using the random number value stored in the OTP 122 in the replaced SoC 11_New, the decryption is correctly performed. Then, the process proceeds to step S21.

<Step S21>

However, since the control parameter CP1 in the FROM 12_New is a parameter for the HDD 1_New which is a replacement source, the firmware FW1 cannot read the data from the system area 131 of the disk 13 even when the control parameter CP1 is used by the execution by the CPU 111. If the control parameter CP1 of the HDD 1_New prepared for part replacement is similar to the control parameter CP1 of the physically destructed HDD 1, when the firmware FW1 can read the data from the system area 131 by using the control parameter CP1 by the execution by the CPU 111 (step S21: possible), the process proceeds to step S23. On the other hand, as usually expected, when the firmware FW1 cannot read the data from the system area 131 by using the control parameter CP1 by the execution by the CPU 111 (step S21: impossible), the process proceeds to step S22.

<Step S22>

Since the firmware FW1 cannot read the data from the system area 131 even when the control parameter CP1 is used by the execution by the CPU 111, the firmware FW2 cannot be started up. As described above, since the firmware FW2 cannot be started up, the user data in the user area 132 in the HDD 1 cannot be read.

<Step S23>

When the firmware FW1 can read the data from the system area 131 by using the control parameter CP1 by the execution by the CPU 111, the firmware FW2 can be started up. Then, the process proceeds to step S24.

<Step S24>

However, in this case, the control parameter CP2 and the encryption key EK in the system area 131 of the disk 13 are decrypted by the AES 113 by using the random number value stored in the OTP 122 in the replaced SoC 11_New. Since the random number value stored in the OTP 122 in the replaced SoC 11_New is different from the random number value stored in the OTP 122 of the SoC 11 before the replacement, the decryption cannot be correctly performed. Then, the process proceeds to step S25.

<Step S25>

Therefore, the firmware FW2 cannot read the user data in the user area 132 of the disk 13 by the execution by the CPU 111 even when the decrypted control parameter CP2 and the encryption key EK are used. In addition, the firmware FW2 performs the verification of the control parameter CP2 by using the verification value of the decrypted control parameter CP2 by the execution by the CPU 111, and a result of the verification is NG, so that the process is stopped. As described above, since the HDD 1 which is an encryption HDD cannot be started up, the user data of the user area 132 in the HDD 1 cannot be read.

It is noted that, when the verification of the control parameter CP2 fails as described above, it can be checked that the random number values used are different, that is, the SoC 11 is illegally replaced with the SoC 11_New, and thus, at this point, the firmware FW0 or the firmware FW2 may disconnect the e-fuse 123 in the SoC 11_New by the execution by the CPU 111.

As illustrated in the flow of steps S11 to S25 above, even when the disposal processing company attempts the replacement with only the SoC 11_New or the SoC 11_New and the FROM 12_New from the HDD 1_New of the same model as the physically destructed HDD 1, in any case, the user data in the user area 132 in the HDD 1 cannot be read.

As described above, the HDD 1 according to this embodiment includes the SoC 11 on which the CPU 111 is mounted, the e-fuse 123 which is required for the execution operation of the CPU 111 and is provided on the clock signal line CL or the power supply line PL or the like mounted on the SoC 11, the OTP 122 which stores the random number value corresponding to the SoC 11 in a non-rewritable manner and is mounted on the SoC 11, the FROM 12 which stores the control parameter CP1 required for driving the disk 13 in a state where the encryption using the random number value is performed on the control parameter CP1 so that the control parameter CP1 can be used with the random number value again, and the disk 13 having the user area 132 which stores the user data and the system area 131 which stores the control parameter CP2 required for reading the user data from the user area 132 in a state where the encryption using the random number value is performed on the control parameter CP2 so that the control parameter CP2 can be used with the random number value again. When the CPU 111 receives the destruct instruction from the outside, the CPU 111 allows the e-fuse 123 to be disconnected. Accordingly, since the e-fuse 123 is destructed to be disconnected so that the HDD 1 cannot be started up, the user can prevent the HDD 1 from being released to the market again as a reused product, an online auction product, or the like, so that the HDD 1 can be safely disposed of. In addition, no special destruction tool is required, and the HDD 1 can be destructed only by transmitting the destruct instruction from the host terminal or the like, so that the risk of damage to the element or ignition is low and the safety is high. In addition, since the e-fuse 123 can be disconnected with a very simple circuit configuration in which power is only input to the SoC 11, even in a failure state in which the disk 13 cannot rotate due to a defective electrical component mounted in the HDD 1, irrestorable destruction can be reliably performed. In addition, since the control parameters CP1 and CP2 that are different for each HDD 1 are encrypted with the random number values (values that are different for each HDD 1) in the SoC 11, the HDD 1 cannot be started up when the SoC 11 is replaced, so that the irrestorable destruction can be implemented.

It is noted that, in the HDD 1 of the first embodiment described above, both the control parameter CP2 and the encryption key EK of the system area 131 are encrypted by using the random number values. It is noted that the present disclosure is not limited to this. At least one of the control parameter CP2 and the encryption key EK may be encrypted. For example, when only the encryption key EK is encrypted, even when the SoC 11 is replaced, the encryption key EK cannot be decrypted normally, so that the user data can be prevented from being read from the user area 132. However, as illustrated in FIG. 2 described above, since the HDD 1 is in the same state as when only the encryption key EK is erased and the disposal processing company is requested to dispose of the HDD 1, the state is not a preferable state. On the other hand, when at least the control parameter CP2 is encrypted, even when the SoC 11 is replaced, the accessing process itself to the user area 132 can be prevented, so that it is desirable to encrypt at least the control parameter CP2.

Second Embodiment

An HDD 1 according to a second embodiment will be described focusing on differences from the HDD 1 according to the first embodiment. In the first embodiment, the configuration in which the HDD 1 as an encryption HDD can be prevented from being re-distributed to the market and can be safely disposed of is described. In this embodiment, a configuration in which an HDD (hereinafter, sometimes referred to as a "non-encryption HDD") that does not have an encryption function can be prevented from being re-distributed to the market and can be safely disposed of will be described. It is noted that, since the HDD 1 according to this embodiment does not have an encryption function, the HDD 1 does not include the AES 113 in the configuration illustrated in FIG. 5.

Figure 10:
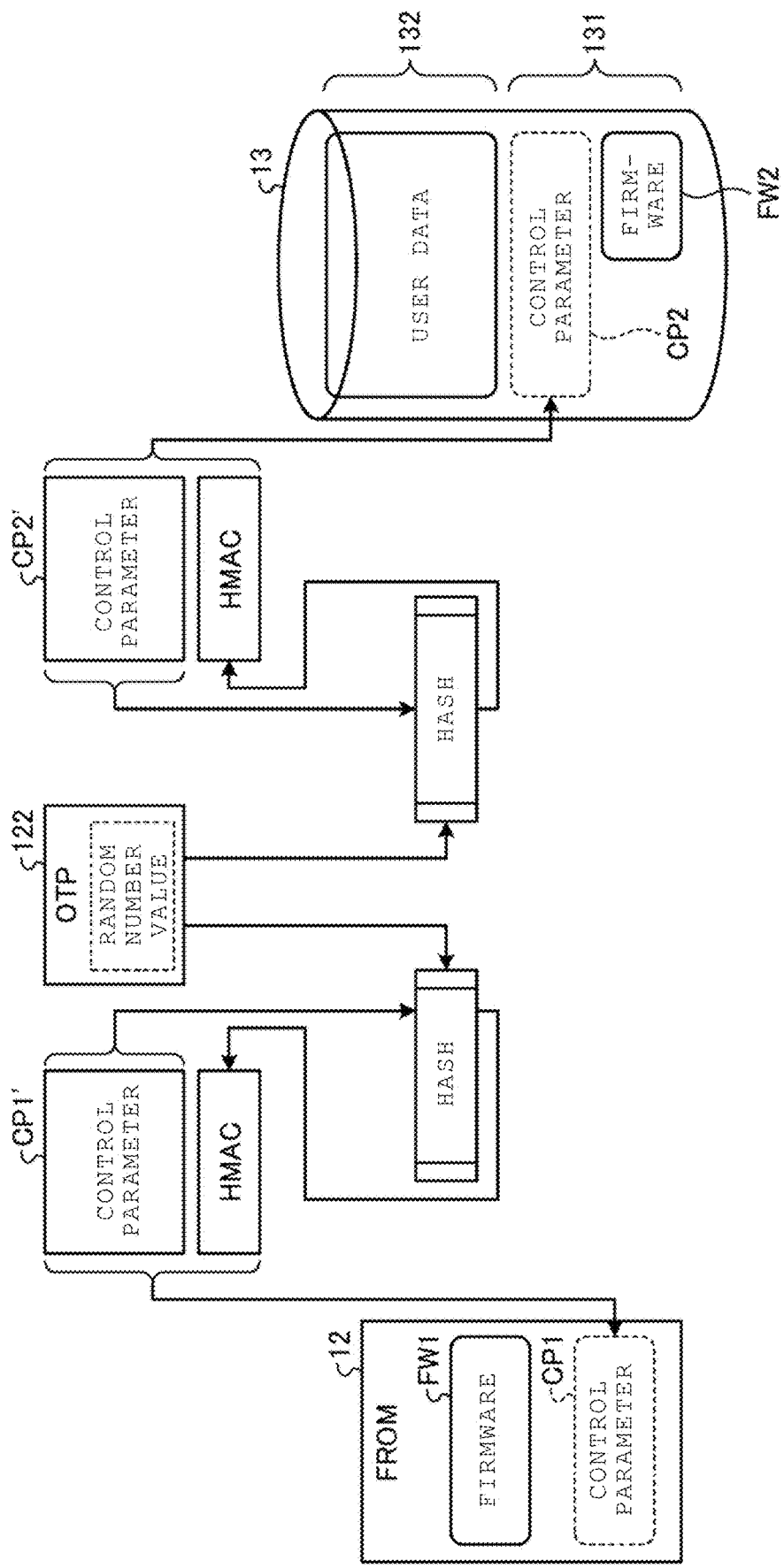
FIG. 10 is a diagram illustrating an example of a mode of storing control parameters in a storage device according to a second embodiment.

FIG. 10 is a diagram illustrating an example of a mode of storing control parameters in the storage device according to the second embodiment. The mode of storing the control parameters CP1 and CP2 in the HDD 1 according to this embodiment will be described with reference to FIG. 10. It is noted that the control parameters CP1 and CP2 before addition of a hash-based message authentication code (HMAC) described later will be referred to as control parameters CP1' and CP2' for the convenience of the description.

Before shipping the HDD 1, the manufacturer of the HDD 1 adds (performs an example of the first process) a verification value (first verification value) of the HMAC or the like calculated based on the random number value stored in the OTP 122 and the control parameter CP1' to the control parameter CP1' and, after that, stores, in the FROM 12, a control parameter CP1 (first control parameter). That is, it can be said that the above-mentioned addition of the verification value is in a state where the control parameter CP1 can be used with the random number value again later. In addition, before shipping the HDD 1, the manufacturer of the HDD 1 adds (performs an example of the second process) a verification value (second verification value) of the HMAC or the like calculated based on the random number value stored in the OTP 122 and the control parameter CP2' to the control parameter CP2' and, after that, stores, in the system area 131 of the disk 13, a control parameter CP2 (second control parameter). That is, it can be said that the above-mentioned addition of the verification value is in a state where the control parameter CP2 can be used with the random number value again later.

It is noted that, when the HDD 1 internally generates the random number value and writes the random number value to the OTP 122, the firmware FW2 may have a function of adding the respective HMACs to the control parameter CP1' stored in the FROM 12 and the control parameter CP2' stored in the system area 131 when the random number is written to the OTP 122 and, after that, re-storing the control parameters in the FROM 12 and the system area 131, respectively.

In addition, the verification value added to the control parameters CP1 and CP2 may be a digital signature using, for example, an RSA and the like instead of the HMAC. In this case, the random number value stored in the OTP 122 may be used as the public key, and the private key may be erased immediately after the digital signature is added.

Figure 11:
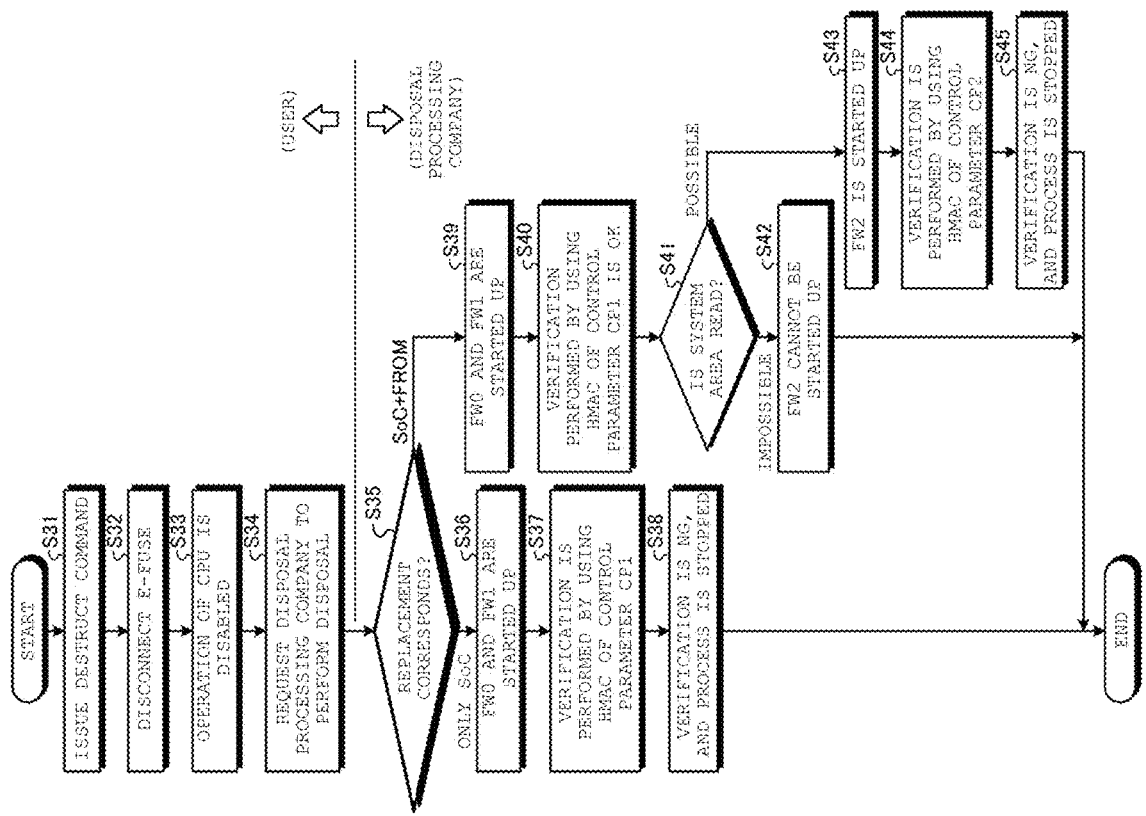
FIG. 11 is a flowchart illustrating an example of a flow of handling and processing of the storage device according to the second embodiment.

FIG. 11 is a flowchart illustrating an example of the flow of handling and processing of the storage device according to the second embodiment. The flow of handling and processing of the HDD 1 according to this embodiment will be described with reference to FIG. 11.

<Step S31>

When the user of the HDD 1 disposes of the HDD 1 which is a non-encryption HDD, the user allows the host terminal to issue the destruct command by operating the host terminal connected to the I/F port 17. Then, the CPU 111 receives the destruct command via the I/F port 17. Then, the process proceeds to step S32.

<Step S32>

When the CPU 111 receives the destruct command, the CPU 111 starts the firmware FW0. The firmware FW0 outputs the disconnect instruction for disconnecting the e-fuse 123 to the e-fuse 123 by the execution by the CPU 111. Accordingly, the e-fuse 123 is disconnected. Then, the process proceeds to step S33.

<Step S33>

When the e-fuse 123 is disconnected, the clock signal line CL is disconnected, and thus, the clock signal is not supplied to the CPU 111, so that the operation of the SoC 11 (CPU 111) is disabled. Accordingly, all of the firmware FW0, the firmware FW1, and the firmware FW2 cannot be executed, and the HDD 1 cannot be started up. Then, the process proceeds to step S34.

<Step S34>

The user hands over the HDD 1 physically destructed by disconnecting the e-fuse 123 to the disposal processing company and requests the disposal processing company to perform disposal. Then, the process proceeds to step S35.

<Step S35>

Hereinafter, the case where the disposal processing company that receives the disposal request for the HDD 1 attempts to re-distribute the HDD 1 to the market as a reused product, an online auction product, or the like as an illegal process will be described. As illustrated in FIG. 9 described above, when the disposal processing company extracts the SoC 11_New from the HDD 1_New of the same model as the physically destructed HDD 1 and attempts to replace the SoC 11 of the HDD 1 as an illegal process (step S35: only the SoC), the process proceeds to step S36. On the other hand, as illustrated in FIG. 9, when the disposal processing company extracts the SoC 11_New and the FROM 12_New from the HDD 1_New of the same model as the physically destructed HDD 1 and attempts to replace the SoC 11 and the FROM 12 of the HDD 1 as an illegal process (Step S35: SoC+FROM), the process proceeds to step S39.

<Step S36>

It is considered a case where the disposal processing company extracts the SoC 11_New from the HDD 1_New of the same model as the physically destructed HDD 1 and attempts to replace the SoC 11 of the HDD 1 with the SoC 11_New as an illegal process. Since the e-fuse 123 of the replaced SoC 11_New in the HDD 1 is not disconnected, when the power of the HDD 1 is turned on, the firmware FW0 stored in the mask ROM 112 is executed (started up) by the CPU 111, and the firmware FW1 stored in the FROM 12 is also started up. Then, the process proceeds to step S37.

<Step S37>

In this case, the firmware FW1 verifies the control parameter CP1 by using the random number value stored in the OTP 122 and the HMAC of the control parameter CP1 by the execution by the CPU 111. Then, the process proceeds to step S38.

<Step S38>

Since the random number value used for the verification of the control parameter CP1 is different from the random number value stored in the OTP 122 of the SoC 11 before the replacement, the verification is NG. Therefore, the firmware FW1 stops the process by the execution by the CPU 111. As described above, since the HDD 1 which is a non-encryption HDD cannot be started up, the user data in the user area 132 in the HDD 1 cannot be read.

It is noted that, when the verification of the control parameter CP1 fails as described above, it can be checked that the random number values used are different, that is, the SoC 11 is illegally replaced with the SoC 11_New, and thus, at this point, the firmware FW0 or the firmware FW1 may disconnect the e-fuse 123 in the SoC 11_New by the execution by the CPU 111.

<Step S39>

It is considered a case where the disposal processing company extracts the SoC 11_New and the FROM 12_New from the HDD 1_New of the same model as the physically destructed HDD 1 and attempts to replace the SoC 11 and the FROM 12 of the HDD 1 as an illegal process. Since the e-fuse 123 of the replaced SoC 11_New in the HDD 1 is not disconnected, when the power of the HDD 1 is turned on, the firmware FW0 stored in the mask ROM 112 is executed (started up) by the CPU 111, and the firmware FW1 stored in the replaced FROM 12_New is also started up. Then, the process proceeds to step S40.

<Step S40>

In this case, the firmware FW1 verifies the control parameter CP1 by using the random number value stored in the OTP 122 and the HMAC of the control parameter CP1 by the execution by the CPU 111. Since the control parameter CP1 in the FROM 12_New is originally the one to which the HMAC using the random number value stored in the OTP 122 in the replaced SoC 11_New is added, the verification succeeds (verification values match each other).

<Step S41>

However, since the control parameter CP1 in the FROM 12_New is a parameter for the HDD 1_New which is a replacement source, the firmware FW1 cannot read the data from the system area 131 of the disk 13 even when the control parameter CP1 is used by the execution by the CPU 111. If the control parameter CP1 of the HDD 1_New prepared for part replacement is similar to the control parameter CP1 of the physically destructed HDD 1, when the firmware FW1 can read the data from the system area 131 by using the control parameter CP1 by the execution by the CPU 111 (step S41: possible), the process proceeds to step S43. On the other hand, as usually expected, when the firmware FW1 cannot read the data from the system area 131 by using the control parameter CP1 by the execution by the CPU 111 (step S41: impossible), the process proceeds to step S42.

<Step S42>

Since the data cannot be read from the system area 131 even when the control parameter CP1 is used by the execution by the CPU 111, the firmware FW1 cannot start the firmware FW2. As described above, since the firmware FW2 cannot be started up, the user data in the user area 132 in the HDD 1 cannot be read.

<Step S43>

When the firmware FW1 can read the data from the system area 131 by using the control parameter CP1 by the execution by the CPU 111, the firmware FW2 can be started up. Then, the process proceeds to step S44.

<Step S44>

In this case, the firmware FW2 verifies the control parameter CP2 by using the random number value stored in the OTP 122 and the HMAC of the control parameter CP2 by the execution by the CPU 111. Then, the process proceeds to step S45.

<Step S45>

Since the random number value used for the verification of the control parameter CP2 is different from the random number value stored in the OTP 122 of the SoC 11 before the replacement, the verification is NG. Therefore, the firmware FW2 stops the process by the execution by the CPU 111. As described above, since the HDD 1 which is a non-encryption HDD cannot be started up, the user data of the user area 132 in the HDD 1 cannot be read.

It is noted that, when the verification of the control parameter CP2 fails as described above, it can be checked that the random number values used are different, that is, the SoC 11 is illegally replaced with the SoC 11_New, and thus, at this point, the firmware FW0 or the firmware FW2 may disconnect the e-fuse 123 in the SoC 11_New by the execution by the CPU 111.

As illustrated in the flow of steps S31 to S45 above, even when the disposal processing company attempts the replacement with only the SoC 11_New or the SoC 11_New and the FROM 12_New from the HDD 1_New of the same model as the physically destructed HDD 1, in any case, the user data in the user area 132 in the HDD 1 cannot be read.

Even in the HDD 1 according to this embodiment as described above, since the e-fuse 123 is destructed to be disconnected so that the HDD 1 cannot be started up, the user side can prevent the HDD 1 from being released to the market again as a reused product, an online auction product, or the like, so that the HDD 1 can be safely disposed of. In addition, with respect to a non-encryption HDD having no encryption function, in order for the user side to avoid information leakage, the only measure is to overwrite and erase the user data over time or physically destruct the HDD with a special tool. However, the HDD 1 according to this embodiment can be destructed in an instant, and the leakage of the user data after the disuse of the HDD 1 can be prevented.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure. Further, although several embodiments are delineated (e.g., First Embodiment, Second Embodiment, etc.), it should be understood that while certain aspects may be mutually exclusive, others may not, and certain aspects of each embodiment may be combined to form additional embodiments.

What is claimed is:

1. A storage device configured to receive an external input from an external device, the storage device comprising:

a system on a chip (SoC);

a storage configured to be controlled through the SoC;

a fuse provided on an electric line mounted in the SoC, wherein the fuse is configured to be disconnected based at least in part on the external input;

a first memory communicatively connected with the storage, wherein the first memory stores a unique value corresponding to and unique to the SoC in a non-rewritable manner and is mounted on the SoC;

a second memory communicatively connected with the first memory, wherein the second memory stores a first control parameter required for driving the storage in a state where a first process using the unique value is performed on the first control parameter so that the first control parameter is configured to be used with the unique value again, wherein the storage has a first area which stores a user data and a second area which stores a second control parameter required for reading the user data from the first area in a state where a second process using the unique value is performed on the second control parameter so that the second control parameter is configured to be used with the unique value again; and an encryption circuit which encrypts data by using the unique value,
wherein the second memory stores the first control parameter which is encrypted by the encryption circuit by using the unique value as the first process, and
wherein the storage stores, in the second area, the second control parameter which is encrypted by the encryption circuit by using the unique value as the second process.

2. The storage device of claim 1, wherein the second memory stores the first control parameter which is encrypted by the encryption circuit by using the unique value as the first process and a first verification value for verifying the first control parameter, and
wherein the storage stores, in the second area, the second control parameter which is encrypted by the encryption circuit by using the unique value as the second process and a second verification value for verifying the second control parameter.

3. The storage device of claim 2, wherein the SoC stops an operation when verification of the first control parameter using the first verification value fails or when the verification of the second control parameter using the second verification value fails.

4. The storage device of claim 2, wherein the SoC disconnects the fuse when verification of the first control parameter using the first verification value fails or when the verification of the second control parameter using the second verification value fails.

5. The storage device of claim 1, wherein the storage stores, in the second area, an encryption key which is encrypted by the encryption circuit by using the unique value and is used for encrypting and decrypting the user data stored in the first area.

6. The storage device of claim 1, wherein the first memory comprises a one-time programmable memory and the second memory comprises a read-only memory.

7. The storage device of claim 1, wherein the SoC comprises a central processing unit (CPU), and the fuse is provided in a signal line as the electric line connected to an output device which outputs a clock signal to the CPU.

8. The storage device of claim 1, wherein the SoC comprises a central processing unit (CPU), and the fuse is provided in a power supply line as the electric line for supplying electric power to the CPU.

9. A storage device configured to receive an external input from an external device, the storage device comprising:
a system on a chip (SoC);
a storage configured to be controlled through the SoC;
a fuse provided on an electric line mounted in the SoC, wherein the fuse is configured to be disconnected based at least in part on the external input;
a first memory communicatively connected with the storage, wherein the first memory stores a unique value corresponding to and unique to the SoC in a non-rewritable manner and is mounted on the SoC; and
a second memory communicatively connected with the first memory, wherein the second memory stores a first control parameter required for driving the storage in a state where a first process using the unique value is performed on the first control parameter so that the first control parameter is configured to be used with the unique value again, wherein the storage has a first area which stores a user data and a second area which stores a second control parameter required for reading the user data from the first area in a state where a second process using the unique value is performed on the second control parameter so that the second control parameter is configured to be used with the unique value again,
wherein the second memory stores the first control parameter together with a first verification value generated from the first control parameter by using the unique value as the first process, and
wherein the storage stores, in the second area, the second control parameter together with a second verification value generated from the second control parameter by using the unique value as the second process.

10. A storage device configured to receive an external input from an external device, the storage device comprising:
a system on a chip (SoC) replaceable from the storage device;
a storage separable from the SoC and configured to be controlled through the SoC, wherein the storage has a first area which stores a user data and a second area which stores a second control parameter required for reading the user data from the first area in a state where a second process using a unique value is performed on the second control parameter so that the second control parameter is configured to be used with the unique value again;
a fuse provided in the SoC configured to be disconnected based at least in part on the external input, wherein disconnection of the fuse renders the SoC inoperable and prevents unwanted data recovery from the storage;
a processor configured to execute firmware to disconnect the fuse upon determination that the SoC has been replaced within the storage device;
a first memory communicatively connected with the storage, wherein the first memory stores a unique value corresponding to and unique to the SoC in a non-rewritable manner and is mounted on the SoC; and
a second memory communicatively connected with the first memory, wherein the second memory stores a first control parameter required for driving the storage in a state where a first process using the unique value is performed on the first control parameter so that the first control parameter is configured to be used with the unique value again, wherein the first memory comprises a one-time programmable memory and the second memory comprises a read-only memory.

11. The storage device of claim 10, wherein the SoC comprises a central processing unit (CPU).

12. The storage device of claim 11, wherein the fuse is provided in a signal line as an electric line for supplying electric power to the CPU.

13. The storage device of claim 11, wherein the fuse is provided in a power supply line as an electric line for supplying electric power to the CPU.

14. The storage device of claim 10,
wherein the second memory stores the first control parameter which is encrypted by an encryption circuit by using the unique value as the first process, and
wherein the storage stores, in the second area, the second control parameter which is encrypted by the encryption circuit by using the unique value as the second process.

15. The storage device of claim 14, wherein the second memory stores the first control parameter together with a first verification value generated from the first control parameter by using the unique value as the first process, and wherein the storage stores, in the second area, the second control parameter together with a second verification value generated from the second control parameter by using the unique value as the second process.

16. The storage device of claim 15, wherein the SoC stops an operation when verification of the first control parameter using the first verification value fails or when the verification of the second control parameter using the second verification value fails.

* * * * *